United States Patent [19]

Cameron et al.

[11] 4,190,076
[45] Feb. 26, 1980

[54] DAMPING VALVE FOR PRESSURE REGULATOR

[75] Inventors: Albert R. Cameron, Huntingdon Beach; Donald R. Gneiding, Fullerton, both of Calif.

[73] Assignee: The Singer Company, New York, N.Y.

[21] Appl. No.: 890,003

[22] Filed: Mar. 24, 1978

[51] Int. Cl.² .......................................... F16K 31/12
[52] U.S. Cl. ............................ 137/505.45; 251/54; 188/298
[58] Field of Search ............... 137/514.3, 514.5, 514.7, 137/505.45, 505.44, 505.41, 489.5; 188/276, 312, 316, 322, 298; 251/54

[56] References Cited

U.S. PATENT DOCUMENTS

| 792,757 | 6/1905 | Cloos | 137/505.41 X |
|---|---|---|---|
| 1,166,358 | 12/1915 | Grant | 137/505.44 |
| 1,275,641 | 8/1918 | Armstrong | 137/505.45 |
| 2,105,876 | 1/1938 | Birch | 137/505.41 |
| 2,178,974 | 11/1939 | Smith | 137/489.5 |
| 2,196,436 | 4/1940 | Briggs | 188/276 |
| 2,599,956 | 6/1952 | Wallace | 137/505.44 |
| 3,948,498 | 4/1976 | Hirano | 188/298 X |

Primary Examiner—Harold W. Weakley
Attorney, Agent, or Firm—Charles R. Lewis

[57] ABSTRACT

A damping valve for a pressure regulator wherein the valve is actuated by a valve diaphragm and coacts with an inlet orifice formed in the transverse wall separating the inlet from the outlet. An outlet chamber is formed on the outlet side of the wall. A damping chamber is formed in the housing below the valve and separated from the outlet chamber by a flexible seal. A connecting rod passes through the central aperture in the seal, and has one end connected to the valve and the other end connected to a piston slidingly disposed in the damping chamber. The piston has a hexagonal head having six circular segmented openings or flats which provide passages for a hydraulic liquid which fills the damping chamber to pass from one side of the piston to the other whenever the piston is moved responsive to a corresponding movement of the valve. The flexible seal acts as a volume compensator whereby volume changes resulting from pressure or temperature variations, or connecting rods penetration into the liquid damping chamber are continuously compensated for.

2 Claims, 5 Drawing Figures

DAMPING VALVE FOR PRESSURE REGULATOR

BACKGROUND OF THE INVENTION

In prior art gas pressure regulators, an attempt is made to construct them with as little friction as possible so as to achieve low hysteresis losses in operation. However, under low friction there exists a tendency for the moving parts to oscillate rapidly when gas flows through the inlet orifice. This produces an undesirable effect commonly called "buzz". One solution to this is to build mechanical friction into the pressure regulator to prevent the "buzz". The disadvantage of this solution however, is to produce increased hysteresis and associated losses.

Some prior art pressure regulators have approached the problem using a dash pot of partially filled liquid, which is orientation sensitive. Other prior art dash pots were complex and/or of limited use in that they were incorporated at the valve head.

SUMMARY OF THE INVENTION

It is an object of the present invention to provide an improved damping valve for pressure regulators which overcomes the prior art disadvantages; which is simple, economical and reliable; which uses a completely filled liquid damping chamber; which has a round headed piston with a plurality of circumferentially spaced flats to permit liquid passage therethrough; which does not increase the hysteresis or associated losses so as to permit the pressure regulator to be constructed with little friction; and which includes a flexible seal to separate the outlet chamber from the damping chamber.

Other objects and advantages will be apparent from the following description of one embodiment of th invention and the novel features will be particularly pointed out hereinafter in the claims.

BRIEF DESCRIPTION OF THE DRAWINGS

This invention is illustrated in the accompanying drawings in which.

DESCRIPTION OF THE INVENTION

Figure 1:
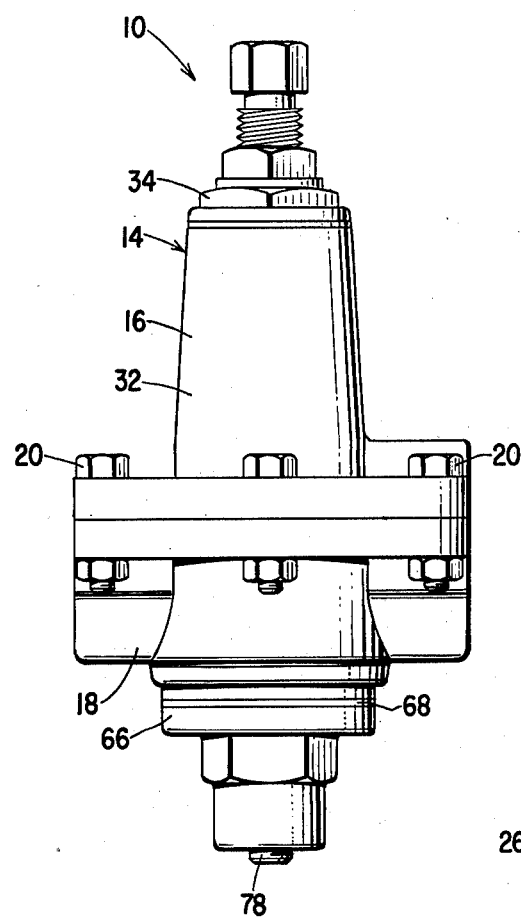
FIG. 1 is a front elevational view of a pressure regulator embodying the present invention.

In the embodiment of the invention illustrated in FIG. 1 a pressure regulator, generally designated 10, is preferably a pilot regulator of the type used to pressure balance a main valve diaphragm for positive positioning of a main line valve with respect to flow. The pilot regulator 10 will provide fast, accurate and stable pressure regulation, especially where large load changes occur, where large pressure reductions are required, and where there is a considerable variation in the inlet pressure. Such a pilot regulator 10 is also used where the outlet pressure exceeds the practical limits of spring or weight loading. One of the principal advantages of the pilot regulator 10 of the present invention is the elimination of the "buzz" without producing increased hysteresis. This is possible in the present invention in that the excessive forces are dissipated via a liquid "drag" which normalizes such forces within the damping assembly 12 shown in FIG. 2.

Figure 2:
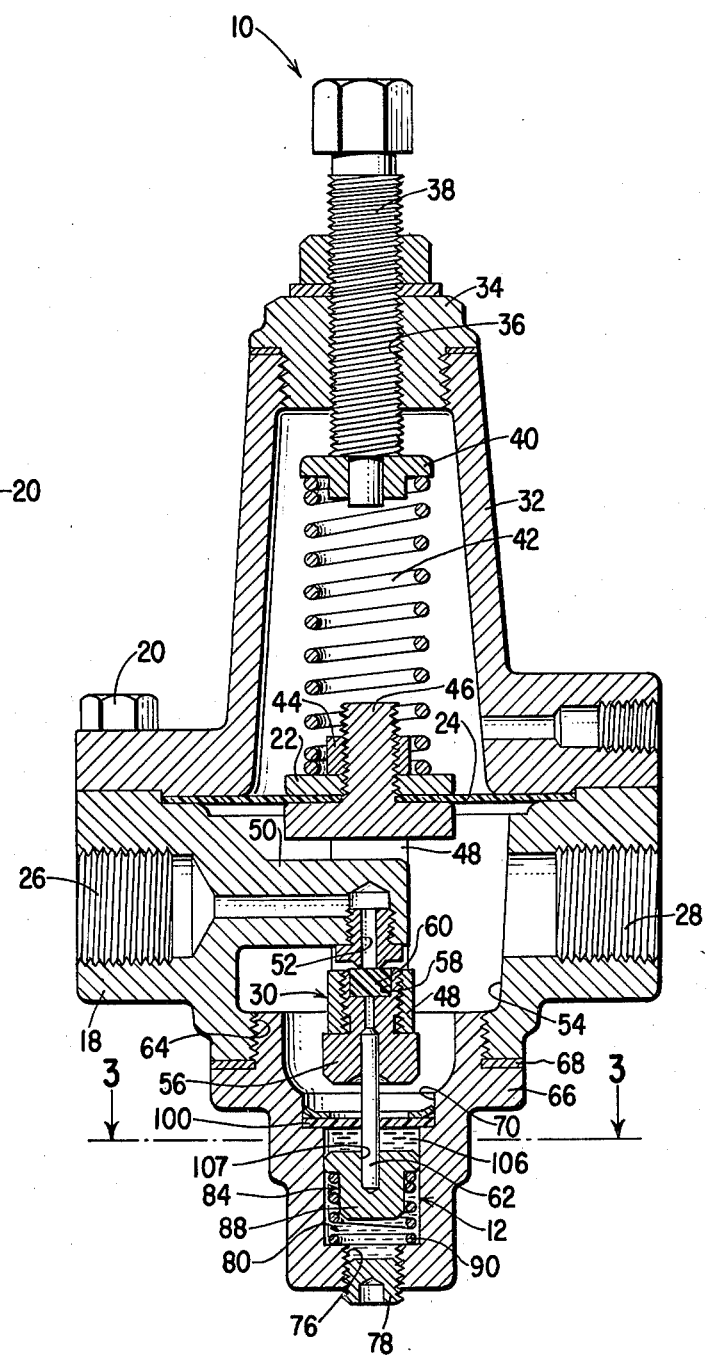
FIG. 2 is an enlarged front elevational view, partly in section, of the pressure regulator of FIG. 1.

The pilot pressure regulator 10 illustrated in FIGS. 1 and 2 includes a housing 14 having an upper portion 16 and a lower portion 18 interconnected to each other by bolts 20. A valve diaphragm 24 is clamped in place by the interconnection of the housing portions 16 and 18. The housing 14 illustrated in FIG. 2, is provided with an inlet 26 and an outlet 28, and a valve assembly 30 which controls the throughput flow in the pilot pressure regulator 10 responsive to the position of the valve diaphragm 24 and the damping action of the damping assembly 12.

The upper housing 16 as shown in FIGS. 1 and 2 has a central upwardly projecting tubular portion 32, the top of which is enclosed by a threaded cap 34 having a central threaded bore 36 which receives a spring pressure adjusting screw 38 therein. The bottom of the screw 38 is fitted with spring retainer 40 to hold the upper end of a spring 42. The spring 42 is a coil compression spring which is loaded by the screw 38, and the lower end of which engages a nut 44 which threadedly receives a threaded stud 46 of a valve yoke 48 which sealingly clamps the diaphragm 24 between the yoke and diaphragm plate 22. The inlet 26 is formed in a transverse wall 50 and narrows down to an inlet orifice 52 which communicates the inlet 26 to the hollow interior of the lower housing portion 18 that forms an outlet chamber 54 which in turn is in direct communication with the outlet 28. The underside of the diaphragm 24 encloses the top of the outlet chamber 54. The valve assembly 30 is disposed in the outlet chamber 54. The valve assembly 30 includes the valve yoke 48 which threadedly receives a valve screw head or valve seat disc screw 56. The screw head 56 has a counterbored central aperture 58 with an enlarged top opening closed by a valve disc 60, made of resilient material to insure positive closure upon coming into contact with the inlet orifice 52, and a somewhat enlarged lower portion thereof into which is slidingly located a connecting rod 62 as illustrated in FIG. 2.

The lower portion 18 of the housing 14 has an open bottom 64 which is enclosed by a valve guide plug 66 threadedly connected thereto and sealed by a gasket 68 at the joint thereof as illustrated in FIGS. 1 and 2. The valve guide plug 66 has a substantially hollow interior which is counterbored at 70 as illustrated in FIGS. 2 and 5 with the upper bore 72 larger than the lower bore 74. The bottom of the valve guide plug 66 has a small tapped opening 76 which threadedly receives a pipe plug 78 to seal the same. The lower bore 74 defines a damping chamber 80 of the damping assembly 12 having a substantially cylindrical wall 82. A piston 84 illustrated in FIGS. 2 and 4 is disposed in the damping chamber 80.

Figure 3:
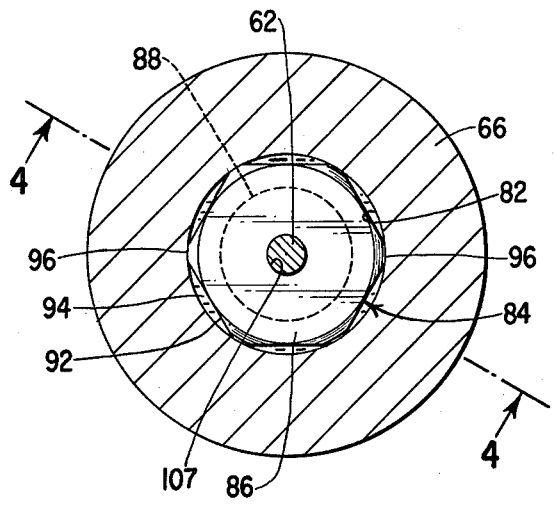
FIG. 3 is a top plan view taken along line 3—3 of FIG. 2.
Figure 4:
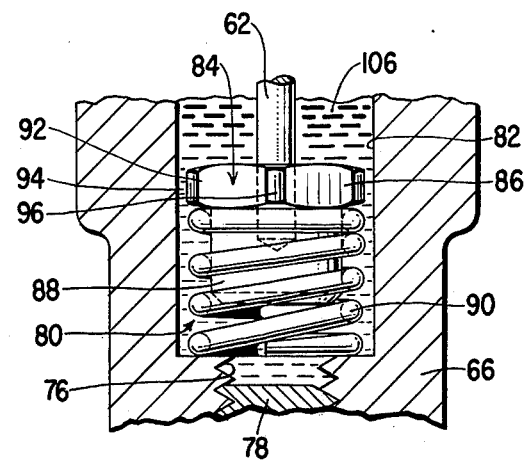
FIG. 4 is a side elevational view taken along line 4—4 of FIG. 3.
Figure 5:
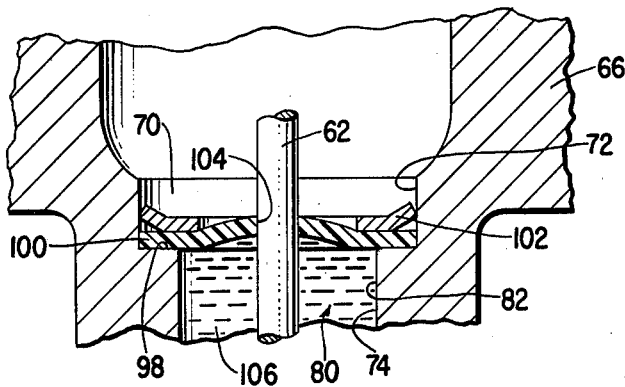
FIG. 5 is an enlarged view of the flexible seal which separates the outlet chamber from the damping chamber.

The piston 84 has a hexagonal-shaped head 86 shown in FIGS. 3 and 4 with a lower section 88 of reduced diameter about which is fitted a balance spring 90. The upper end of the balance spring engages the underside of piston 84, while the lower end thereof rests upon the bottom of the damping chamber 80 substantially about the plugged opening 76. A plurality of flats 92 are formed circumferentially about the sides of the head 86 to define semicircular or segmented openings or passages 94 formed between each of the flats 92 and the cylindrical wall 82 of the damping chamber 80. A plurality of rounded corners 96 are formed between adjacent flats 94 each having a radius corresponding to the radius of the cylindrical wall 82 to permit a sliding action of the head 86 within the damping chamber 80. The distance between diametrically opposed corners 96 is substantially equal to or just slightly less than the diameter of the damping chamber 80.

The counterbore 70 has an annular shoulder 98 formed at the base of the upper bore 72. A circular flexible seal 100 is placed upon the shoulder 98 to enclose the top of the lower bore 74 and thus sealingly enclose the damping chamber 80 and separate it from the outlet chamber 54. An annular retaining ring 102 is disposed above the flexible seal 100 to clamp the same against the shoulder 98 by engaging the vertical wall of the upper bore 72. A central aperture 104 is formed in the flexible seal 100 to permit passage therethrough of the connecting rod 62, the lower end of which is affixed within a central aperture 106 of the piston 84 so that the piston 84 and valve assembly 30 will move in unison.

The damping chamber 80 is completely filled with a suitable hydraulic liquid 106. The valve diaphragm 24 and the flexible seal 100 are each made of a suitable resilient material. The diaphragm 24 and the spring 42 constitute control means responsive to the pressure in the outlet chamber 54. In operation, the diaphragm 24 illustrated in FIG. 2 will move up or down until the outlet pressure in the outlet chamber 54 on the underside of the diaphragm reaches equilibrium with the spring pressure on the upperside of the diaphragm. The flow of gas through the inlet 26 and inlet orifice 52 is controlled by the valve assembly 30 responsive to the movement of the diaphragm 24 via the valve yoke 48. As the outlet pressure falls, the diaphragm 24 moves downwardly moving the valve yoke 48 and consequently the valve disc 60 away from the inlet orifice 52. This results in the admission of an amount of gas sufficient to maintain the outlet pressure at a certain predetermined adjustable value. Conversely as the pressure in the outlet chamber increases the diaphragm 24 will be urged upwardly until the valve disc 62 closes the inlet orifice 52. To prevent the valve assembly 30 from oscillating rapidly when gas flows through the inlet orifice 52 the damping assembly 12 will produce a certain liquid "drag" as the liquid from one side of the piston 84 flows to the other side of the piston. The motion of the valve assembly 30 is transmitted to the piston 84 via the connecting rod 62, and will be directly proportional thereto in that downward movement of the valve assembly 30 will produce a downward movement of the piston 84, while upward movement of the valve will produce upward movement upon the piston by the force of the spring 90. Accordingly, motion of the valve assembly 30 acts to displace the liquid 106 through the passages 94 in a substantially uniform manner with sufficient passages 94 being provided to permit smooth action and relatively quick response, though the mechanical energy of the motion is converted to heat energy as an effect of viscous friction, to thus dissipate excessive forces which would otherwise tend to sustain oscillation. Thus, losses due to hysteresis are greatly decreased. Also, the hydraulic liquid 106 can be selected to a suitable liquid viscosity dependent on the expected oscillation amplitudes and/or frequencies to be controlled in the operation of the pilot regulator 10.

The damping chamber 80 will continuously be fully filled with the hydraulic liquid 106 due to the effect of the flexible seal 100 as shown in FIG. 5 which is permitted to flex to compensate for any volume change in the liquid resulting from pressure or temperature variations, or the amount of piston rod penetration into or out of the liquid filled damping chamber 80. Accordingly, the pressure differential across the flexible seal 100 will remain at substantially zero, and therefore will not bias the operation of the damping chamber 80.

It will be understood that various changes in the details, materials, arrangements of parts and operating conditions which have been herein described and illustrated in order to explain the nature of the invention may be made by those skilled in the art within the principles and scope of the invention.

Having thus set forth the nature of the invention, what is claimed herein is:

1. A pressure regulator operative responsive to inlet pressure and outlet pressure comprising:
   a. a housing having an inlet, an outlet, a transverse wall separating the inlet and the outlet, and an outlet chamber formed on the outlet side of the transverse wall,
   b. a valve diaphragm disposed on the outlet side of the transverse wall and having one side thereof in communication with the outlet chamber,
   c. an inlet orifice formed in the transverse wall to communicate the inlet with the outlet,
   d. a valve connected to be actuated by the valve diaphragm and to be shifted toward or away from the inlet orifice responsive to the pressure in the outlet chamber,
   e. a damping chamber formed in the housing below the valve, said damping chamber having a circular cross section,
   f. hydraulic liquid filling the damping chamber,
   g. a flexible seal, having a central aperture, to separate the outlet chamber from the damping chamber,
   h. a piston, having a head, slidingly received in the damping chamber, said head of the piston being circular and of substantially equal diameter to the cross section of the damping chamber, a lower portion being formed on the piston below the head and of reduced diameter, and a spring is received about the lower portion and to engage the bottom of the chamber to normally urge the piston upwardly in the direction of the seal.
   i. a plurality of flats formed on the head in circumferentially spaced relationship to each other to provide passages for the hydraulic liquid to pass from one side of the piston to the other whenever the piston is moved,
   j. a connecting rod sealingly passing through the flexible seal, and having one end located in the valve and the other end affixed to the piston, and
   k. said housing having a portion opposite the inlet orifice which is counterbored to define a large upper bore and a small lower bore, with the lower bore forming said damping chamber, the flexible seal being circular and fitted within the upper bore, and a retaining ring clamps the flexible seal to the bottom of the upper bore to enclose the top of the damping chamber.

2. The combination claimed in claim 1 wherein the flexible seal flexes to compensate for changes in volume of the liquid in the damping chamber due to variations in temperature or pressure, or displacement of the liquid due to rod penetration, within the housing whereby the pressure differential across the seal continuously is zero.

* * * * *